US011616441B2

(12) United States Patent
Kouro Renaer et al.

(10) Patent No.: US 11,616,441 B2
(45) Date of Patent: Mar. 28, 2023

(54) TRANSFORMERLESS PARTIAL POWER CONVERTER (PPC) FOR THE DC-DC STAGE OF RAPID-CHARGING STATIONS FOR ELECTRIC VEHICLES (EV)

(71) Applicant: UNIVERSIDAD TÉCNICA FEDERICO SANTA MARÍA, Valparaíso (CL)

(72) Inventors: Samir Felipe Kouro Renaer, Viña del Mar (CL); Sebastián Andre Rivera Iunnissi, Concón (CL); Álvaro Daniel Pesántez Alvarado, Valparaíso (CL)

(73) Assignee: UNIVERSIDAD TÉCNICA FEDERICO SANTA MARÍA, Valparaíso (CL)

( * ) Notice: Subject to any disclaimer, the term of this patent is extended or adjusted under 35 U.S.C. 154(b) by 0 days.

(21) Appl. No.: 17/278,234

(22) PCT Filed: Sep. 21, 2018

(86) PCT No.: PCT/CL2018/050088
§ 371 (c)(1),
(2) Date: Mar. 19, 2021

(87) PCT Pub. No.: WO2020/056534
PCT Pub. Date: Mar. 26, 2020

(65) Prior Publication Data
US 2021/0351698 A1 Nov. 11, 2021

(51) Int. Cl.
H02M 3/158 (2006.01)
B60L 53/22 (2019.01)
(Continued)

(52) U.S. Cl.
CPC ............. *H02M 3/158* (2013.01); *B60L 53/11* (2019.02); *B60L 53/22* (2019.02); *B60L 53/62* (2019.02);
(Continued)

(58) Field of Classification Search
CPC .. H02M 3/158; H02M 3/1586; H02M 1/0095; H02M 3/072; B60L 53/11;
(Continued)

(56) References Cited

U.S. PATENT DOCUMENTS 9,627,965 B2 4/2017 Guo et al.
9,960,687 B2 5/2018 Elasser et al.
(Continued)

OTHER PUBLICATIONS

Rojas, J., et al., Partial Power DC-DC Converter for Electric Vehicle Fast Charging Stations, IECON 2017—43rd Annual Conference of the IEEE Industrial Electronics Society, Beijing, China, 2017, pp. 5274-5279.
(Continued)

*Primary Examiner* — Paul Dinh
(74) *Attorney, Agent, or Firm* — Procopio, Cory, Hargreaves & Savitch LLP

(57) ABSTRACT

Described is a new partial power converter (PPC) for the DC-DC stage of rapid-charging stations for electric vehicles (EV). The proposed converter manages only a fraction of the total power delivered from the grid to the battery, which increases the general efficiency of the system and the power density while potentially reducing the cost of the charger. The proposed topology is based on a switched capacitor between the AC terminals of a bridge converter H and does not require high-frequency isolation transformers in order to provide a source of controllable voltage between the CC link and the battery. The proposed concept can be implemented by using interposed power cells, which can improve energy (Continued)

quality, reduce the size of the inductor, and allow scalability for chargers of higher nominal power.

8 Claims, 7 Drawing Sheets

(51) Int. Cl.
    *B60L 53/62*     (2019.01)
    *B60L 53/10*     (2019.01)
    *B60L 58/10*     (2019.01)
    *H02J 7/00*     (2006.01)

(52) U.S. Cl.
    CPC .............. *B60L 58/10* (2019.02); *H02J 7/007* (2013.01); *B60L 2210/10* (2013.01); *H02J 2207/20* (2020.01)

(58) Field of Classification Search
    CPC .......... B60L 53/22; B60L 53/62; B60L 58/10; B60L 2210/10; H02J 7/007; H02J 2207/20; H02J 7/345; H02J 7/02; Y02T 10/70; Y02T 10/7072; Y02T 10/92; Y02T 90/12; Y02T 90/14; G05F 3/16; G05F 3/20
    USPC ......................................................... 320/109
    See application file for complete search history.

(56) References Cited

U.S. PATENT DOCUMENTS

2015/0162840 A1*   6/2015   Frost ..................... H02M 3/158
                                                        363/21.02
2018/0175732 A1    6/2018   Dai et al.

OTHER PUBLICATIONS www.gptechgroup.com, GP2D060A120B Data Sheet, retrieved Jun. 25, 2015, 3 pgs.
IXYS Corporation, IXGN200N60B3 Data Sheet, 2009, 6 pgs.

* cited by examiner (a) $(S_1, S_2) = (1, 0)$ (b) $(S_1, S_2) = (0, 1)$ (c) $(S_1, S_2) = (0, 0)$

| Parameter | Symbol | Value |
| --- | --- | --- |
| Rated Power | Pd | 70 kW |
| DC Voltage Supply | Vd | 600 V |
| Partial Capacitor | Cp | 1000 μF |
| Output filter inductance | L | 1 mH |
| Output current in CC mode | Ib | 200 A |
| Battery Capacity | Q | 50 Ah |
| Switching frequency | fs | 10 kHz |
| Rated Battery Voltage | Vb | 376.2 V |
| Initial State of Charge | SOC | 50% |

TRANSFORMERLESS PARTIAL POWER CONVERTER (PPC) FOR THE DC-DC STAGE OF RAPID-CHARGING STATIONS FOR ELECTRIC VEHICLES (EV)

CROSS-REFERENCE TO RELATED APPLICATIONS

This application is a U.S. National Stage entry of PCT Application No. PCT/CL2018/050088 filed Sep. 21, 2018, the contents of which are incorporated herein by reference.

FIELD OF APPLICATION

The present invention relates to a transformerless partial power converter (PPC) for the DC-DC stage of rapid-charging stations for electric vehicles (EV).

DESCRIPTION OF PRIOR ART

Electric vehicle (EV) technology is one of the most promising alternatives to replace conventional internal combustion engine vehicles for transportation purposes. Between the years 2010 and 2016, its market has grown considerably, showing a strong increase in accumulated sales, a broader spectrum in terms of models and features, and an ever-increasing acceptance rate among potential drivers. Additionally, automakers have announced that more than 40 models will be released by 2021, further supporting EV acceptance rates.

For this technology, one of the most critical components is the battery storage system. Its energy density, charge time, lifespan, and cost define the performance of the vehicle and consequently is the main driving force of development of this technology. Recent advancements in terms of cost and performance of lithium-ion batteries are allowing manufacturers to increase the nominal capacity of batteries to the range of 60-100 kWh, leading to long-range EVs with mileage of over 300 kilometers (or over 200 miles). By extension, the battery charger is also crucial for the development of EV, so finding improvements to existing charging architectures is also a priority.

The process of charging batteries can be done in different ways, and various power conversion settings can be found, which are generally classified into levels 1, 2, and 3 depending on the rated power. However, the automotive and electric power distribution industries are making great efforts and are focusing on the development of DC rapid-charging (DCRC) technologies. Additionally, due to the increase in battery capacity in current and next-generation electric vehicles, different automakers have released statements regarding a major increase in current power ratings for DCRCs up to 400 kW. The deployment of DCRC networks enables a higher degree of driver confidence, addresses range anxiety, dramatically reduces charging times, and enables long-distance travel. Moreover, it helps those who live in higher-density residential locations where household charging is not an easy solution. Finally, the existence of such networks allows EVs to be used as the only vehicle for their trips, since they allow them to drive their electric vehicles like a conventional car.

The rapid-charging process of EV batteries requires higher power capacity converters than conventional chargers (50 to 400 kW per charging vehicle), so it is unlikely to be an onboard application, therefore it would remain in the form of an offboard public infrastructure. In order to further support a possible large-scale adoption of electric vehicles in the coming years, the development and improvement of rapid-charge power converters is crucial. Given the power ratings of these converters, and especially the amount of power that this application could potentially concentrate, efficiency, power density, and costs have become major drivers of technology development.

Currently, most rapid-charging topologies employ a fully rated power converter to control the currents and voltages that will be supplied to the battery. The increasing power ratings of DCRCs will further challenge these topologies and another approach is required. Regardless of the bus architecture used in the station, these chargers require a DC-DC stage to regulate the battery charging profile as shown in the simplified diagram in FIG. 1. Generally, the charging process for the battery is divided into two stages: constant current (CC) and constant voltage (CV), also known as the CC-CV charge profile. Additionally, most of the battery power is drawn during the CC stage, making it a key stage for high-power rapid charging. This means that, in order to quickly charge the battery, the DC-DC converter is only required to handle this current rating. In other words, as long as the converter generates the required charging current, its output voltage can be a fraction of the voltage of the battery pack, and can be connected in series to the input voltage, as shown in FIG. 2.

Increased charging powers together with an application that potentially concentrates significant amounts of energy greatly increases the impact of the efficiency provided by the energy conversion stages. The reduction of power in the power that the converter must handle offers a cost-effective technique to improve the efficiency obtained in the charging process, i. e., the efficiency of the converter only affects a fraction of the total power given by the partiality ratio.

The concept of partial power has previously been introduced in renewable energy conversion systems. The promising results in photovoltaic systems coupled with the lower variation in battery voltage levels during the charging process, makes partial power processing an attractive concept for DCRC. This approach has an inherent cost-effectiveness, given that the power processed by the DC-DC stage is directly reflected in the cost of the power electronics of the charger. By partially rating the power that the converter must handle, the switching devices used must withstand reduced voltage/current levels, thus significantly reducing costs. Furthermore, the switching frequencies can be increased without compromising overall performance since these losses will not be related to the rated power of the charging process, only a fraction of it, therefore conventional silicon-based devices can be used.

A solution proposed in "J. Rojas, H. Renaudineau, S. Kouro, and S. Rivera, "Partial power dc-dc converter for electric vehicle fast charging stations," in IECON 2017-43rd Annual Conference of the IEEE Industrial Electronics Society, October 2017, pp. 5274-5279", requires a high frequency (HF) isolation DC-DC converter to introduce a controlled voltage source between the DC link and the battery, which will provide the degrees of control necessary to regulate the battery charging process. HF isolation solves the problem, but adds design complexity, produces magnetic losses, and is not easily scalable to higher power levels. Also, the HF transformer does not provide true galvanic isolation for the entire system, due to a bypass connection for partial power operation. The invention features a new HF transformerless partial power conversion DC-DC stage, which can reduce the power handled by the DC-DC stage without sacrificing control of the rapid-charging process, and thus improve the DCRC station efficiency. Neither does it require the presence of a high-frequency transformer to allow the control of the voltage between the DC link and the battery voltage, as presented in the cited solution.

U.S. Pat. No. 9,960,687B2, dated May 1, 2018, by ELASSER AHMED et al., entitled SYSTEM AND METHOD FOR A DC/DC CONVERTER, shows some closeness to the invention, in the sense that the circuit that converts power only handles a fraction of the total power that the system supplies to its charge, while the other part is delivered directly to the charge without undergoing conversion losses. Despite the above, both proposals differ considerably at a functional and topological level. First, the cited invention is oriented as a DC-DC interface between the energy storage element of an EV, HEV, or PHEV and its traction system, while the proposed invention is oriented to the DC-DC interface between the energy storage element and the electrical network that will provide the energy charging. This difference has a huge impact on the dynamic response and the operating mode of both devices as they are absolutely different regimes, and with regard to the topological level, there are also great differences in the structure of the circuit, the number of active components needed, the number of passive elements, the need for galvanic isolation, commutation principle, among others. The proposed converter does not require a high frequency isolation stage in its structure, which reduces its cost, volume, and weight, making it more compact than the solutions that do require such a stage.

Patent application US20180175732A1, dated Jun. 21, 2018, from FUTUREWEI TECHNOLOGIES INC, entitled High-Efficiency Regulated Buck-Boost Converter, uses the partial connection of a capacitive DC link to reduce the voltage associated with the blocking of semiconductor devices and thus reduce the losses associated with this stage. However, the operation of said converter requires the assistance of a charge balance circuit, so the effective partiality of the system is not such, since it simply divides the power into more converters, in conclusion, the conversion stages are different, have a higher degree of complexity, and their principles of operation also differ.

U.S. Pat. No. 9,627,965B2, dated Apr. 18, 2017, of DELTA ELECTRONICS INC, entitled High-efficiency regulated buck-boost converter, is based on the connection of an intermediate point of the capacitive DC link, with the difference that it uses a three-position switch to select the voltage level required by the charge, by modifying the negative point connection of the supplied charge. At the topological level, the circuits are also different, despite the fact that both perform a reduction of the voltage handled by the converter. However, it needs to use two storage elements, or to regulate the floating point of a DC link capacitor, for the partial power conversion to be effective. There is a clear operational and circuit difference.

An invention is proposed that features a new HF transformerless partial power conversion DC-DC stage, which can reduce the power handled by the DC-DC stage without sacrificing control of the rapid-charging process, and therefore improve efficiency of the DCRC station. It does not require the presence of a high frequency transformer to allow the control of the voltage between the DC link and the voltage of the battery to be charged.

SUMMARY OF THE INVENTION

An object of the invention is to have a transformerless partial power converter (PPC) for the DC-DC stage of rapid-charging stations for electric vehicles (EV), comprising one or more switching H-bridge channels (cell), where one or more said switching H-bridge is formed by forced commutation semiconductors $S_{a1}$, $S_{a2}$, $S_{a3}$, and $S_{a4}$, with a DC link floating capacitor C, a bypass diode D, and an output inductor L; in an interleaved or multi-channel configuration, where the configuration of the one or more channels can be replicated to connect in parallel and be able to divide the current handled by each of them, where the forced commutation semiconductors $S_{a1}$, $S_{a2}$, $S_{a3}$, and $S_{a4}$, can be insulated gate bipolar transistors, IGBT; and the bypass diode D can be replaced by an active semiconductor device such as an IGBT, a metal-oxide-semiconductor field-effect transistor (MOSFET), or the like.

The connection of the switching H-bridge cells is done in an unconventional way, since the DC link floating capacitor C is connected to the AC terminals ($V_p$, $i_c$) while the DC terminals of the switching H-bridge are used to make the series connection between the positive terminal of the input voltage $V_d$ and the output inductor L, the output inductor L is connected between the output of the H-bridge and the positive terminal of the voltage of the battery to be charged, thus regulating both the partial voltage $V_p$ of the transformerless partial power and the output current $i_L$ that is injected into the battery to be charged. The switching H-bridge is operated in such a way that the partial voltage $V_p$ is added or subtracted from $V_d$ to establish the voltage of the output inductor L and, therefore, it allows to regulate the current that is injected into the battery to be charged. In order to regulate the charging process, both the partial voltage $V_p$ of the floating capacitor C and the output current $i_L$ must be controlled, wherein these two variables are related to the sum and the difference of the duty cycles of the switching H-bridge, which operates with a bipolar PWM method. In order to reduce the relationship between the partial voltage $V_p$ and the output current $I_L$, a control system is designed that imposes slow dynamics for changes in the partial voltage $V_p$ for which a significantly smaller closed-loop bandwidth compared to the current loop is chosen; thus, the slow dynamic is compensated by the partial voltage regulator $V_p$ and its influence in steady state is eliminated. The control system consists of two closed loops, wherein the first loop is the conventional cascade control architecture, which regulates the voltage of the battery to be charged through the internal regulation of the output current $i_L$ of the output inductor L, wherein each of the aforementioned quantities are regulated with proportional-integral (PI) controllers, and their output is $d_\Sigma$. The reference signals for this control loop are defined by the battery management system, in addition to the selected charge profile, which in this case is the constant current (CC)-constant voltage (CV) method; the second control loop is the one used to regulate the partial voltage $V_p$, which is also controlled through a proportional-integral (PI) controller and its output is $d_\Delta$, and the reference for this partial voltage $V_p$ is the one that establishes the partiality ratio of the proposed control system and therefore defines the amount of power that the transformerless partial power converter processes; Once the sum and difference duty cycles have been obtained, $d_1$ and $d_2$ are reconstructed and fed to a pulse width modulator to generate the activation signals.

DETAILED DESCRIPTION OF A PREFERRED EMBODIMENT

Figure 1:
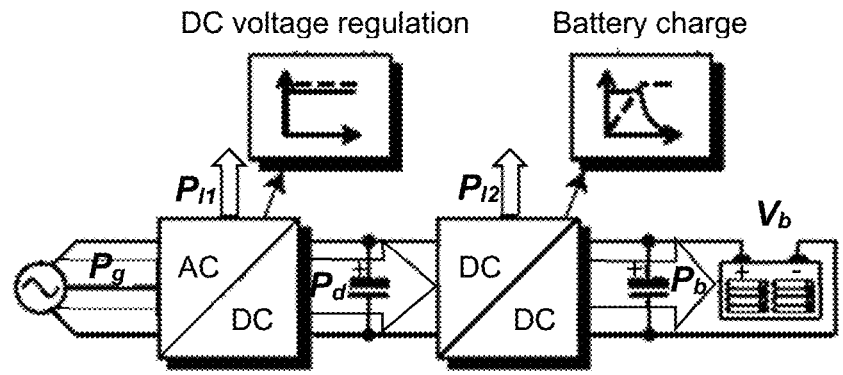
FIG. 1 describes a two-stage conversion system for DCRC, of the rated power DC-DC converter type, which comprises the state of the art.
Figure 2:
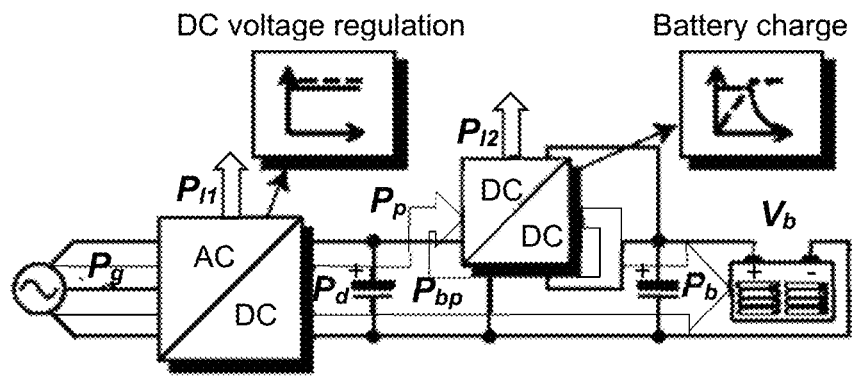
FIG. 2 describes a two-stage converter for DCRC, of the partial power DC-DC converter type, which comprises the state of the art.
Figure 3:
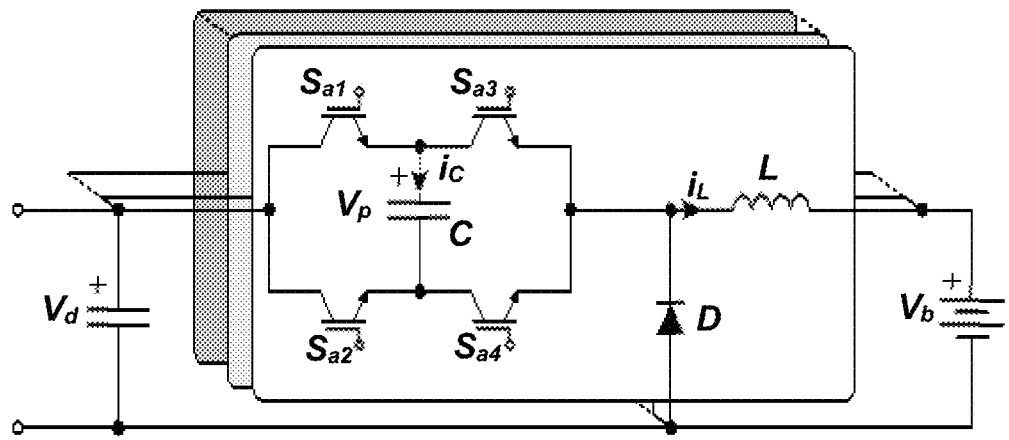
FIG. 3 describes the invention of a partial power converter for DCRC based on H-bridge cell with interleaved switched capacitor.

The proposed power circuit for the transformerless partial power converter shown in FIG. 3, comprising at least one switching H-bridge channel (cell), formed by the forced commutation semiconductors $S_{a1}$, $S_{a2}$, $S_{a3}$, and $S_{a4}$, such as an insulated gate bipolar transistor, IGBT, with a DC link floating capacitor C, a bypass diode D, which can also be replaced by an active semiconductor device such as an IGBT, a metal-oxide-semiconductor field-effect transistor (MOSFET) or similar, and an output inductor L. To achieve the desired power level through a modular and scalable approach, an interleaved or multi-channel configuration is used. FIG. 3 shows in detail the structure of the transformerless partial power converter with a detailed channel, which can be replicated to be connected in parallel and be able to divide the current handled by each of them.

From FIG. 3, it is also observed how the connection of the switching H-bridge cells is carried out in an unconventional way, since the DC link floating capacitor C is connected to the AC terminals ($V_p$, $i_c$) while the DC terminals of the switching H-bridge are used to make the series connection between the positive terminal of the input voltage $V_d$ and the output inductor L. The latter is connected between the output of the H-bridge and the positive terminal of the voltage of the battery to be charged. This allows regulating both the partial voltage Vp of the transformerless partial power and the output current $i_L$ that is injected into the battery to be charged.

With appropriate settings, the transformerless partial power converter presented herein can function as voltage reduction unit (buck), while providing higher efficiency and performance compared to conventional topology. In addition, the fact that the switches have to block reduced voltages, allows the use of switching devices with lower ratings, thus reducing the size and cost of the rapid-charging unit.

The objective of the power circuit is to arbitrarily set the partial voltage $V_p$ to a value that allows to regulate the output current $i_L$ of the channel and, at the same time, maintain the conduction instants of the bypass diode D to a minimum. The result is a transformerless partial power converter that most of the time works with switches that block a partial voltage, and during the ON times of the bypass diode D these switches have to block half of the input DC voltage. This approach allows to effectively increase the energy conversion efficiency even though the structure has a greater number of devices when compared to a conventional buck converter, which only has one semiconductor.

Operational Description

Figure 4:
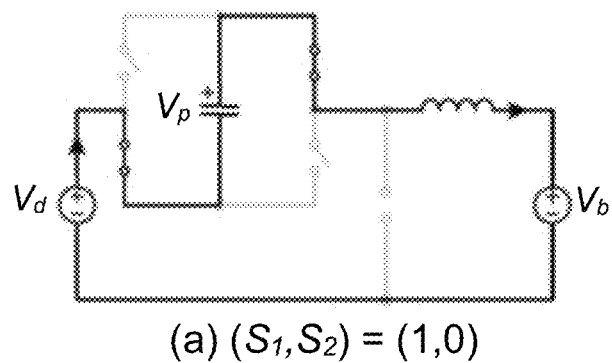
FIG. 4 describes the switching states and equivalent circuits of the invention.
Figure 4:
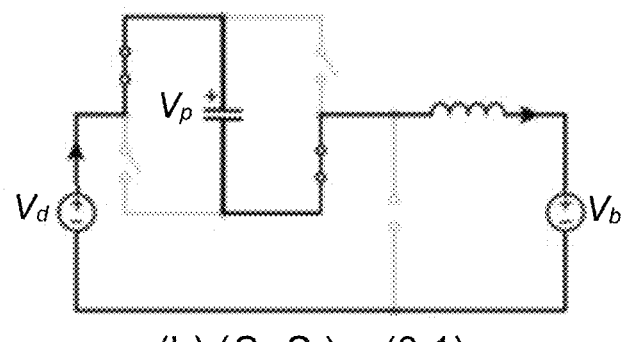
Figure 4:
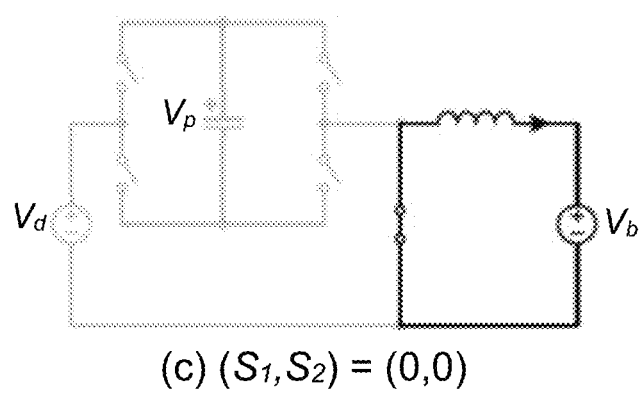

Depending on the selected value of the partial voltage $V_p$, the transformerless partial power converter works as a voltage reduction unit (buck) with improved efficiency. The switching H-bridge cell is operated in such a way that the partial voltage $V_p$ is added or subtracted from $V_d$ to establish the voltage of the output inductor L and, therefore, it allows to regulate the current that is injected into the battery to be charged. To determine the input/output ratio of the transformerless partial power converter, a volt-second balance analysis is performed based on the defined quantities. Considering that the transformerless partial power converter is operating in a steady state, the variations in the output current $i_L$ during its charging and discharging processes must be equal throughout a switching period, leading to:

$$\frac{(V_d + V_p - V_b)}{L} t_1 = \frac{(V_p + V_b - V_d)}{L} t_2 + \frac{V_b}{L} t_d \quad (1)$$

$$V_b T_s = V_d(t_1 + t_2) + V_p(t_1 - t_2) \quad (2)$$

Where $t_1$ represents the time when the partial voltage is added to the input voltage, a switching state that can be seen in FIG. 4a, $t_2$ is the time when the partial voltage is subtracted from $V_d$ as shown in FIG. 4b, and $t_d$ is the time when bypass diode D conducts as illustrated in FIG. 4c. By defining the duty cycles (that is, $d_1=t_1/T_s$, $d_2=t_2/T_s$, $d_d=t_d T_s$), it is possible to determine the input-output ratio of the transformerless partial power converter.

$$V_b = V_d(d_1+d_2)+V_p(d_1-d_2) \quad (3)$$

Having defined the steady state transfer function of the proposed transformerless partial power converter, and introducing the sum and difference duty cycles, the equations that model the dynamics of the transformerless partial power converter are as follows:

$$L\frac{di_L}{dt} + R_L i_L = V_d d_\Sigma + V_p d_\Delta - V_b \quad (4)$$

$$C_p \frac{dV_p}{dt} = i_L d_\Delta \quad (5)$$

$$d_\Sigma = d_1 + d_2 \quad (6)$$

$$d_\Sigma = d_1 - d_2 \quad (7)$$

The duty cycles alternate between the different switching states of the transformerless partial power converter shown in FIG. 3. There are basically two states in which the partial voltage $V_p$ of the floating capacitor C alternates between the positive and negative connection and a derivative state, in which the current stored in the output inductor L circulates freely and is discharged through the bypass diode D. The proposed transformerless partial power converter behaves largely like a regular converter in which the active switch is replaced by a controlled capacitor switch. The fact that the partial voltage $V_p$ is the difference between the input and output voltage, produces the partial power operation in the transformerless partial power converter. It should be noted that when operating in the free circulation state, with the rated current flowing through the output inductor L and the bypass diode D, the transformerless partial power converter behaves exactly like a classical full power converter.

Control scheme

To properly regulate the charging process, both the partial voltage $V_p$ of the floating capacitor C and the output current $i_L$ must be controlled. These two variables are related to the sum and difference of the switching H-bridge duty cycles, and their introduction simplifies the controller design. By defining the duty cycles of the sum-delta domain and suitably adjusting the dynamics of the closed loop, the control scheme presented in FIG. 4(a, b, c) is designed. The switching H-bridge is operated with a bipolar PWM method.

Considering that there is a dependence between the output current $i_L$ and the partial voltage $V_p$, this is appropriately addressed to maintain the stability of the transformerless partial power converter. To reduce this coupling, the partial voltage $V_p$ regulator is designed in such a way that it imposes slow dynamics for changes in the partial voltage $V_p$ for which a significantly smaller closed loop bandwidth is chosen compared to the current loop. The slow dynamics will be compensated by the partial voltage $V_p$ regulator and its influence in steady state is eliminated.

Figures 5, 6:
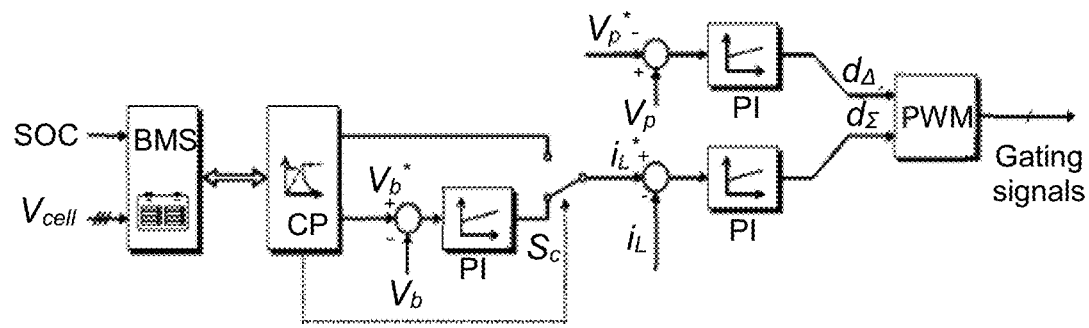
FIG. 5 describes a proposed control scheme for the partially classified charging station.
FIG. 6 describes a table with the parameters of a battery charging operation.

As shown in FIG. 5, a proposed control system consists of two closed loops. The first loop is the conventional cascade control architecture, which regulates the voltage of the battery to be charged through the internal regulation of the output current $i_L$ of the output inductor L. Each of the above-mentioned quantities are regulated with proportional-integral (PI) controllers, and their output is $d_\Sigma$. As usual, the reference signals for this control loop are defined by the battery management system, in addition to the selected charge profile, which in this case is the constant current (CC)-constant voltage (CV) method, which stands for constant current-constant voltage (CC-CV).

The second control loop is the one used to regulate the partial voltage $V_p$, which is also controlled through a PI, and its output is $d_{66}$. It should be noted that the reference for this partial voltage $V_p$ is the one that establishes the partiality relationship of the proposed control system and, therefore, defines the amount of power that the transformerless partial power converter processes. Once the sum and difference duty cycles have been obtained, $d_1$ and $d_2$ are reconstructed and fed to a pulse width modulator to generate the activation signals.

Operation Results

To validate the proposed configuration, a test has been developed that considers a rapid-charging station that provides a charging power of 70 kW, while the power converter only processes approximately 40 kW, with the CC-CV charging profile, and the transition between modes will be done at SOC=94%. After validating the conversion method, the same conversion is simulated using a conventional full power converter, in order to establish a comparison in terms of current fluctuation and conversion efficiency. Table 6 presents the rest of the test parameters.

A. Steady State Performance

Figure 7:
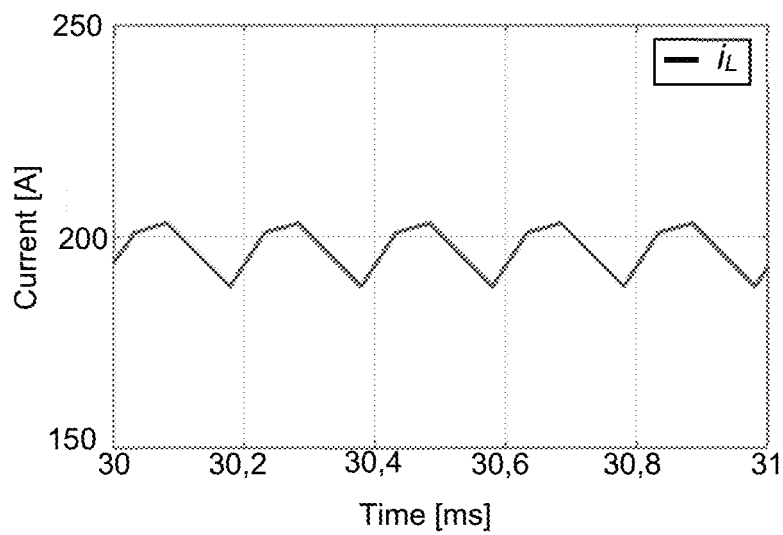
FIG. 7 describes the current output $i_L$ curve during DC mode.

Since the transformerless partial power converter initially operates in CC mode, the rapid-charging unit feeds the battery with its rated current, which in one case is 200A, as shown in FIG. 7. The current through the battery, in CC mode, follows the 200A reference, this current exhibits ripple of 7.527% of its average value.

Figure 8:
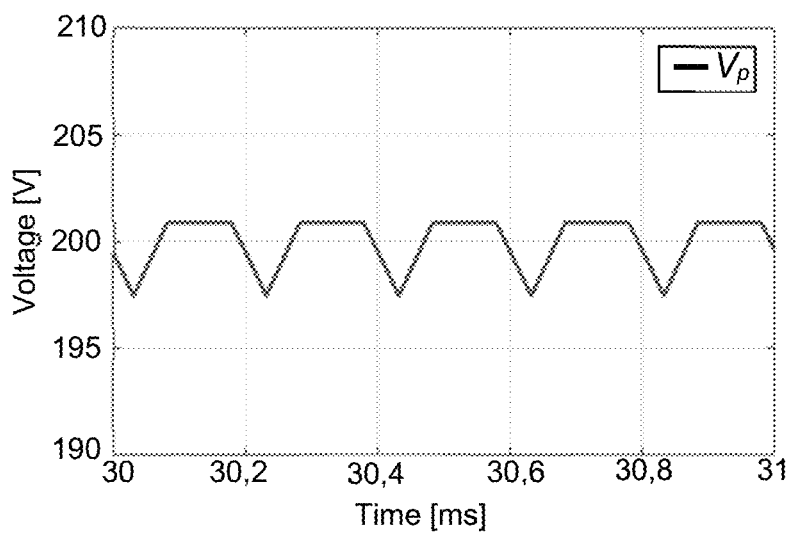
FIG. 8 describes the waveform of the result of the partial voltage $V_p$, during operation.
Figure 9:
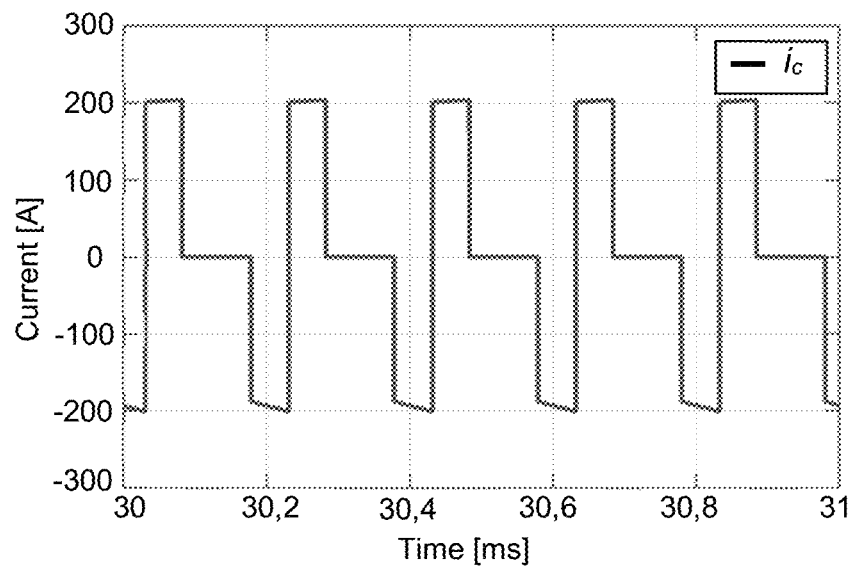
FIG. 9 describes the waveform of the result of the current in the capacitor $i_c$ during operation.

Then the transformerless partial power converter can satisfactorily regulate the charging process, while keeping the partial voltage regulated at 200V as seen in FIG. 8. It can be seen how the current $i_L$ and the capacitor voltage $V_p$ are tightly regulated. In addition, it can be seen that the charge and discharge cycles are well balanced, allowing the partial voltage $V_p$ to be kept in check, as shown in FIG. 8. The transformerless partial power converter voltage has a ripple of 3.487 V, equivalent to 1.74% of its average value. Consequently, the net current flowing through the floating capacitor C is zero according to FIG. 9.

Figure 10:
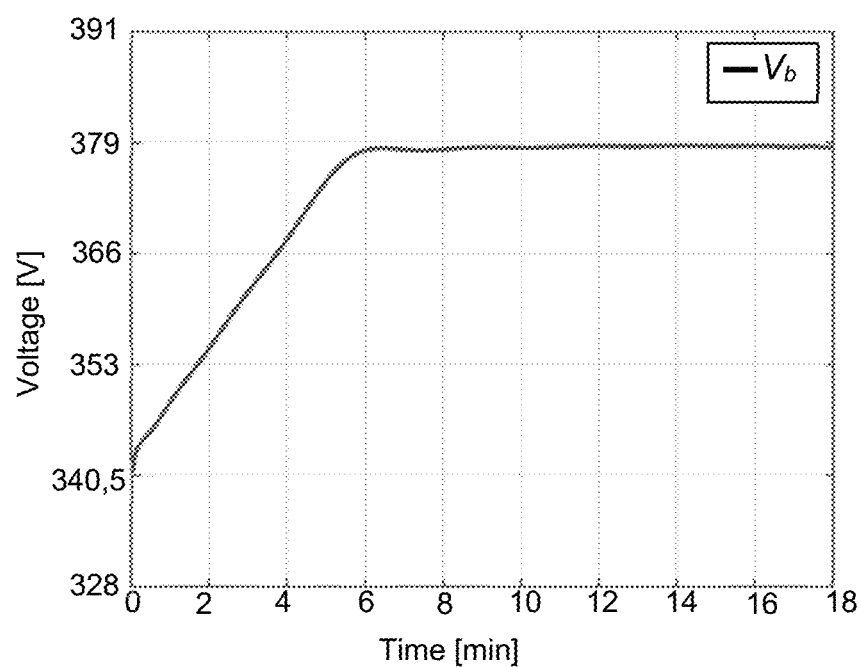
FIG. 10 describes the behavior of the battery voltage during operation.
Figure 11:
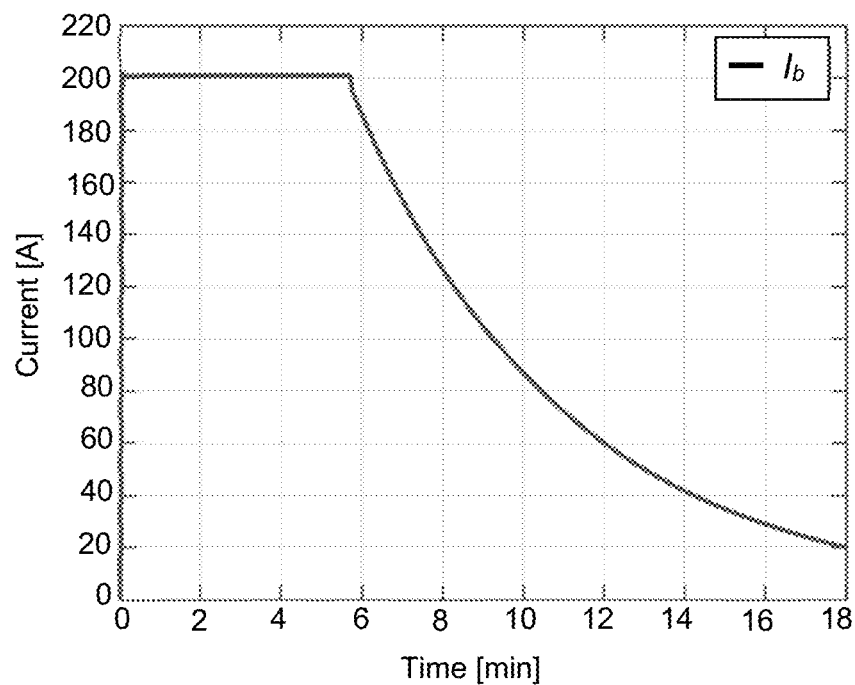
FIG. 11 describes the behavior of the battery current during operation.
Figure 12:
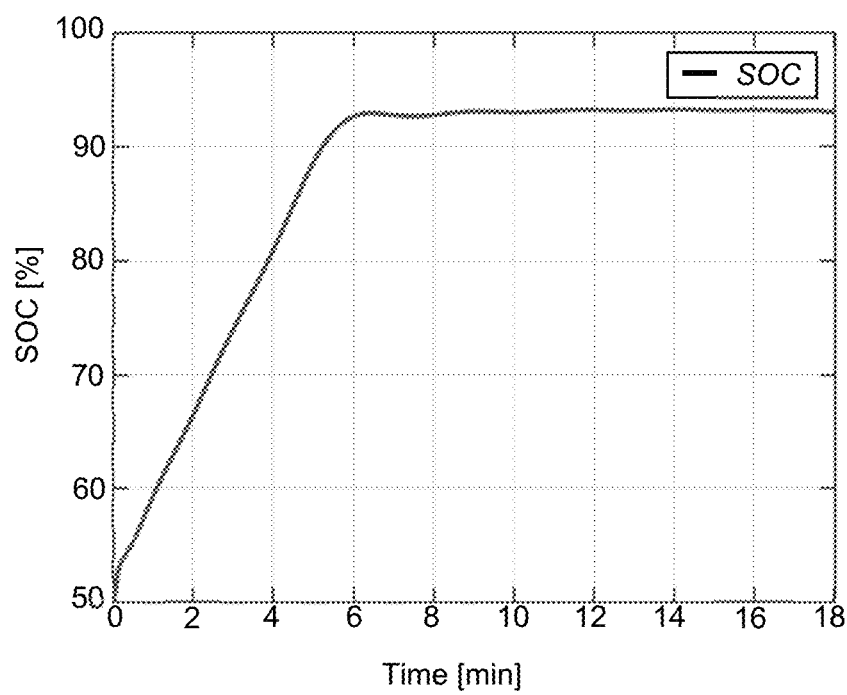
FIG. 12 describes the result of the battery charge status during operation.

A broader look at rapid-charging operation is presented in FIGS. 10 and 11, which present the battery quantities throughout the charging process. The CC-CV charging profile is clearly observed, which means that the battery charging process has two modes of operation. First, during CC mode a constant current is provided to the battery until the controller switches to CV mode at t=342.6 s, when it reaches a particular state of charge. In this mode, the current begins to decrease exponentially until the current through the battery reaches 10% of this initial value and the State of Charge (SOC) reaches 94% as shown in FIG. 12.

Figure 13:
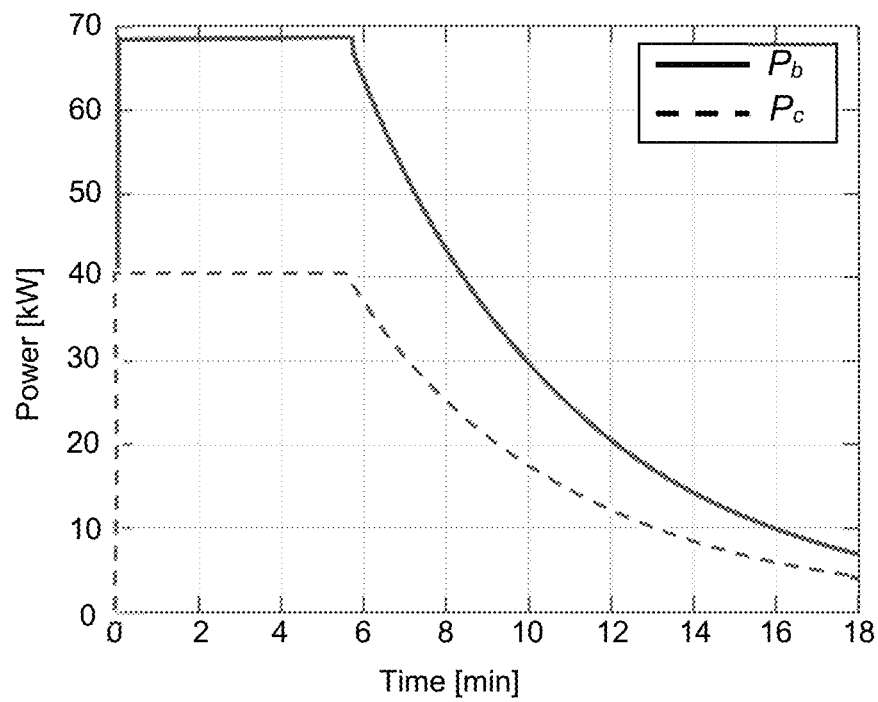
FIG. 13 describes the total power delivered and the power processed by the converter of the invention.

As mentioned above, the main characteristic of the proposed charge topology is the reduction in power that the power electronics must handle. In the present results, it is observed that the total power delivered to the battery reaches approximately 68.4 kW during CC mode, according to the measurements in FIG. 12. However, the power actually handled by the transformerless partial power converter is simply 40.1 kW. Therefore, the transformerless partial power converter operates with a partial power ratio of 58.62% during the entire charging process as shown in FIG. 13. As mentioned above, the partial power ratio depends on the partial voltage $V_p$, and considering that this voltage remains constant throughout the test, the converter also maintains its partiality.

B. Loss Assessment

Once the operation of the transformerless partial power converter has been validated, an efficiency analysis is required. In order to evaluate the efficiency performance of the transformerless partial power converter, the following conduction and switching losses are considered; for this purpose, the thermal modeling tool of the PLECS software is used. The thermal description required for this test is taken from the device data sheets. IXYS IXGN200N60B3 IGBT and GP2D060A120B silicon carbide diode are considered.

Figure 14:
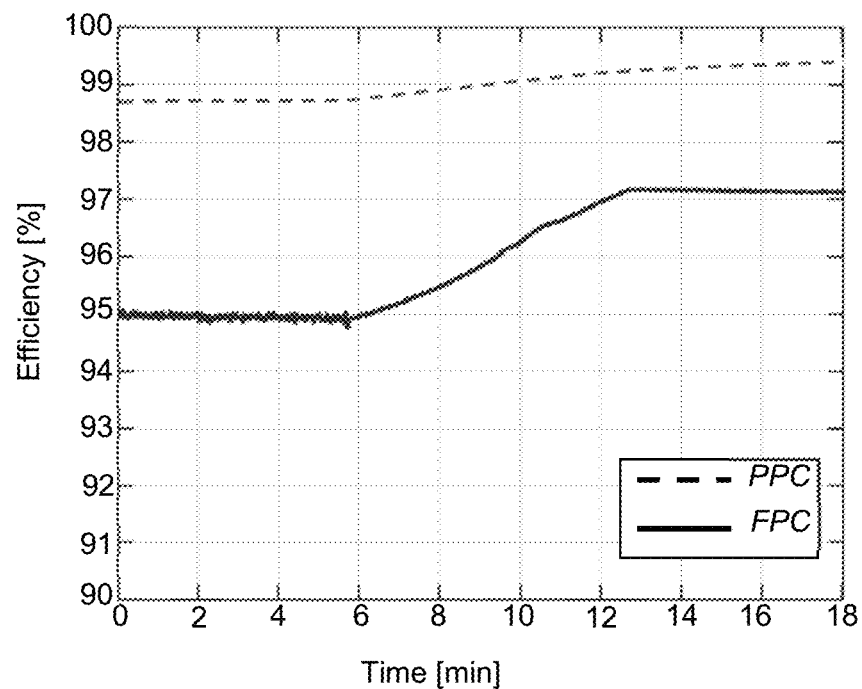
FIG. 14 describes the efficiency compared between a full power converter and a partial power converter.

In order to make a comparison of the proposed configuration, tests are carried out with a conventional full power converter under the same operating conditions and providing the same amount of power to the charge. FIG. 14 shows the efficiency comparison between the two converters, the proposed transformerless partial power converter has an efficiency of 98.77% relative to a 94.87% efficiency of the full power converter in CC mode. The efficiency in the two converters increases slightly when the controller switches to CV mode, reaching at the end of the charging process values of 99.41% for the transformerless partial power converter and 96.73% for the full power converter.

Conclusion

The invention proposes a transformerless partial power converter based on a high-frequency transformer topology for an electric vehicle rapid-charging station.

The transformerless partial power converter takes advantage of the voltage characteristic of battery packs and only processes part of the total power provided by the charger. The result of the proposed conversion method is a significant improvement in the efficiency of the converter. The transformerless partial power converter only handles a fraction of the DC link voltage.

The invention claimed is:

1. A transformerless partial power converter (PPC) for a DC-DC stage of rapid-charging stations of electric vehicles (EV), characterized in that it comprises:
   one or more switching H-bridge channels,
   wherein one or more each of said one or more switching H-bridge channels is formed by a bypass diode D, an output inductor L, and a switching H-bridge having forced commutation semiconductors $S_{a1}$, $S_{a2}$, $S_{a3}$, and $S_{a4}$, with a DC link floating capacitor C, and
   wherein said switching H-bridge channels are connected in parallel with each other at an input of the switching H-bridge, at an input of the diode D and at an output of the inductor L.

2. The transformerless partial power converter according to claim 1, characterized in that the forced commutation semiconductors $S_{a1}$, $S_{a2}$, $S_{a3}$, and $S_{a4}$, are insulated gate bipolar transistors IGBT.

3. The transformerless partial power converter according to claim 1, characterized in that the bypass diode D is replaced by an active semiconductor device of an IGBT bipolar transistor type or a metal-oxide-semiconductor field effect transistor (MOSFET).

4. The transformerless partial power converter according to claim 1, characterized in that the DC link floating capacitor C is connected to AC terminals ($V_p$, $i_c$) of the switching H-bridge while the DC terminals of the switching H-bridge are used to make a series connection between a positive terminal of an input voltage $V_d$ and the output inductor L, the output inductor L is connected between the output of the H-bridge and the positive terminal of the voltage of a battery to be charged, thereby regulating both a partial voltage in the AC terminal $V_p$ of the transformerless partial power converter and an output current $i_L$ that is injected into the battery to be charged.

5. The transformerless partial power converter according to claim 1, characterized in that the switching H-bridge channel is operated in such a way that a partial voltage $V_p$ is added or subtracted from an input voltage $V_d$ to establish a voltage of the output inductor L and, therefore, it allows to regulate current that is injected into a battery to be charged.

6. The transformerless partial power converter according to claim 1, characterized in that, in order to regulate a charging process, both a partial voltage $V_p$ of the floating capacitor C and an output current $i_L$ must be controlled, wherein these two variables are related to a sum and a difference in duty cycles of the switching H-bridge, which operates with a bipolar method of pulse width modulation (PWM).

7. The transformerless partial power converter according to claim 1, characterized in that, in order to reduce a relationship between a partial voltage $V_p$ and an output current $i_L$, a control system is designed that imposes a slow dynamics for changes in the partial voltage $V_p$ for which a significantly smaller closed loop bandwidth is chosen compared to a current loop; thus, the slow dynamics is compensated by the partial voltage $V_p$ and an influence of $V_p$ in steady state of the output current $i_L$ is eliminated.

8. The transformerless partial power converter according to claim 1, characterized in that a control system consists of two closed loops, wherein a first loop is a conventional cascade control architecture, which regulates a voltage of a battery to be charged through an internal regulation of an output current $i_L$ of the output inductor L, where the voltage of the battery and the output current $i_L$ are regulated with proportional-integral (PI) controllers, and a voltage output of a first proportional-integral (PI) controller is $d_\Delta$, reference signals for the first control loop are defined by a battery management system, in addition to the where also a selected charge profile in the first control loop, is a constant current (CC)-constant voltage (CV) method; a second control loop is the one used to regulate a partial voltage $V_p$, which is also controlled through a proportional-integral (PI) controller and a voltage output of a second proportional-integral (PI) controller is $d\Delta$, and a reference for the partial voltage $V_p$ is the one that sets a partiality ratio of the control system and, therefore, defines an amount of power that the transformerless partial power converter operates; once a sum and a difference duty cycles have been obtained, a pulse width modulator (PWM) is electrically powered to generate activation signals.

* * * * *